(12) United States Patent
Kang

(10) Patent No.: US 9,188,310 B2
(45) Date of Patent: Nov. 17, 2015

(54) MEMBER FOR BACKLIGHT UNIT USING QUANTUM DOTS AND METHOD OF MANUFACTURING THE SAME

(75) Inventor: Mun Suk Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 67 days.

(21) Appl. No.: 13/817,404

(22) PCT Filed: Feb. 7, 2011

(86) PCT No.: PCT/KR2011/000785
§ 371 (c)(1),
(2), (4) Date: Mar. 22, 2013

(87) PCT Pub. No.: WO2012/023679
PCT Pub. Date: Feb. 23, 2012

(65) Prior Publication Data
US 2013/0194783 A1 Aug. 1, 2013

(30) Foreign Application Priority Data
Aug. 16, 2010 (KR) .......................... 10-2010-0078612

(51) Int. Cl.
*F21V 9/08* (2006.01)
*F21V 8/00* (2006.01)
*G02F 1/1335* (2006.01)
*B82Y 20/00* (2011.01)

(52) U.S. Cl.
CPC ................. *F21V 9/08* (2013.01); *G02B 6/0023* (2013.01); *G02F 1/133615* (2013.01); *B82Y 20/00* (2013.01); *G02F 2001/133614* (2013.01); *Y10S 977/774* (2013.01); *Y10S 977/952* (2013.01)

(58) Field of Classification Search
CPC .............. G02F 1/133617; G02F 2001/133614; G02F 1/133615; G02B 6/0026; G02B 6/0023; F21V 9/08; Y10S 977/774; Y10S 977/952; B82Y 20/00
USPC .......... 362/84, 97.1–97.4; 427/67; 257/13, 79
See application file for complete search history.

(56) References Cited

U.S. PATENT DOCUMENTS

| 7,239,080 | B2 * | 7/2007 | Ng et al. | 313/502 |
| 7,481,562 | B2 * | 1/2009 | Chua et al. | 362/612 |
| 7,819,539 | B2 * | 10/2010 | Kim et al. | 362/84 |
| 7,887,206 | B2 * | 2/2011 | Lee | 362/84 |
| 8,215,815 | B2 * | 7/2012 | Meir et al. | 362/606 |
| 2006/0244358 | A1 | 11/2006 | Kim et al. | |
| 2008/0012031 | A1 * | 1/2008 | Jang et al. | 257/89 |

(Continued)

FOREIGN PATENT DOCUMENTS

| JP | 10-269822 A | 10/1998 |
| JP | 2004-117594 A | 4/2004 |

(Continued)

OTHER PUBLICATIONS

Chung et al., "White Emission Using Mixtures of CdSe Quantum Dots and PMMA as a Phosphor," Optical Materials, vol. 32, 2010, pp. 515-521, XP-26832128A.

*Primary Examiner* — Bao Q Truong
(74) *Attorney, Agent, or Firm* — Birch, Stewart, Kolasch & Birch, LLP

(57) ABSTRACT

A member for a backlight unit using quantum dots is provided comprising a frame where a blue LED is mounted and a light transmitting layer over the frame, wherein the light transmitting layer includes a quantum dot.

20 Claims, 3 Drawing Sheets

(56) References Cited

U.S. PATENT DOCUMENTS

| | | | |
|---|---|---|---|
| 2008/0173886 A1* | 7/2008 | Cheon et al. | 257/98 |
| 2009/0141476 A1* | 6/2009 | Meir et al. | 362/84 |
| 2009/0267051 A1* | 10/2009 | Kim et al. | 257/14 |
| 2010/0128203 A1 | 5/2010 | Shin et al. | |
| 2010/0193806 A1* | 8/2010 | Byun | 257/88 |
| 2011/0068322 A1* | 3/2011 | Pickett et al. | 257/13 |
| 2011/0089809 A1* | 4/2011 | Noh | 313/483 |

FOREIGN PATENT DOCUMENTS

| | | |
|---|---|---|
| JP | 2006-073202 A | 3/2006 |
| JP | 2006-310131 A | 11/2006 |
| JP | 2006-313902 A | 11/2006 |
| JP | 2008-010556 A | 1/2008 |
| JP | 2008-158284 A | 7/2008 |
| KR | 10-2008-0006906 A | 1/2008 |
| KR | 10-2010-0087851 A | 8/2010 |

\* cited by examiner

MEMBER FOR BACKLIGHT UNIT USING QUANTUM DOTS AND METHOD OF MANUFACTURING THE SAME

TECHNICAL FIELD

Embodiments of the present invention are directed to a member for a backlight unit and a method of manufacturing the member, and more specifically to a member for a backlight unit that may raise a color reproduction range and reduce manufacturing costs by using quantum dots.

BACKGROUND ART

Liquid crystal displays (LCDs) take up an important position in information display technologies. An LCD displays images by applying electricity to both substrates with a liquid crystal layer therebetween. Because an LCD panel itself cannot emit light, the LCD needs help the aid of a backlight to generate light.

The backlight is directly associated with brightness and power consumption of the LCD panel. Furthermore, the backlight is one of the most expensive parts of a display module. Accordingly, saving of backlight-related costs may have a crucial effect on the LCD demand. As a light source for a backlight unit, CCFLs, EEFLs, FFLs, or LEDs have been employed. A light source employing LEDs gain popularity with advantages of rapid response speed, good color gamut, and eco-friendly nature in comparison with CCFL light sources.

FIG. 1 is a cross-sectional view illustrating a white LED backlight unit according to the related art. Referring to FIG. 1, the white LED backlight unit includes a white LED light source 100, a light guide 200, a reflection plate 300, and a diffusing plate 400. Specifically, light emitted from the white LED light source 100 is reflected upward by the reflection plate 300. Then, reflected light passes through the light guide 200 and is diffused by the diffusing plate 400, so that white light 40 is radiated. The "white LED" means an LED emitting white light. As methods of implementing a white LED, there are a single chip method and a multichip method. In the single chip method, a blue or violet LED chip is combined with a phosphor to produce a white LED. In the multichip method, two LEDs whose colors are in a complimentary relation or different colors of LED chips are combined to embody a white LED. A white LED may also be implemented using a blue LED emitting blue light together with a phosphor.

FIG. 2 is a cross-sectional view illustrating a white LED light source using a phosphor according to the related art. Referring to FIG. 2, a white LED light source 100 using a phosphor according to the related art includes a frame 120 and a blue LED 110 that is mounted in the frame 120 and buried in a high molecular material, such as, for example, a polymer resin. A phosphor 10, for example, a YAG-based phosphor radiating yellow light (whose wavelength is about 560 nm) is contained in the high molecular material. As a result, blue light 20 emitted from the blue LED 110, which is a nitride-based semiconductor device, is partially absorbed by the YAG-based phosphor 10 which is in turn excited to emit yellow light. The blue light and the yellow light are mixed to produce white light 40. This method has advantages, such as low costs and a simple power circuit, but suffers from a low emission efficiency. Further, blue light 20 and yellow light 20 both have broad wavelength intervals, and this may cause color separation so that strobbing may be prone to occur. Accordingly, it is difficult to mass produce white LEDs having the same color coordinates.

DISCLOSURE OF INVENTION

Technical Problem

Exemplary embodiments of the present invention provide a member for a backlight unit using quantum dots, which may produce clear colors with high color gamut and may be produced at low costs, and a method of manufacturing the member.

Solution to Problem

According to an embodiment of the present invention, there is provided a member for a backlight unit using quantum dots comprising a frame where a blue LED is mounted and a light transmitting layer over the frame, wherein the light transmitting layer includes a quantum dot.

According to an embodiment, the quantum dot may include one or more of a red quantum dot and a green quantum dot that is smaller than the red quantum dot.

According to an embodiment, a diameter of the quantum dot may range from 2 nm to 5 nm.

According to an embodiment, the quantum dot may include one or more of a circular shape, a triangular shape, a rectangular shape, and an elliptical shape.

According to an embodiment, the light transmitting layer may include the quantum dot in a polymer resin, and the polymer resin may include one or more of a silicon resin, an epoxy resin, and an acrylic resin.

According to an embodiment of the present invention, there is provided a method of manufacturing a member for a backlight unit using quantum dots, the method comprising step (a) of mixing a polymer resin with a quantum dot solution so that the quantum dot solution is dispersed in the polymer resin, step (b) printing the mixture on a substrate to have a predetermined thickness, and curing the printed mixture, cutting the cured mixture to a predetermined shape, and step (c) of removing the substrate.

According to an embodiment, in step (a), the quantum dot may include one or more of a red quantum dot and a green quantum dot that is smaller than the red quantum dot.

According to an embodiment, in step (a), a diameter of the quantum dot may range from 2 nm to 5 nm.

According to an embodiment, in step (a), the quantum dot may include one or more of a circular shape, a triangular shape, a rectangular shape, and an elliptical shape.

According to an embodiment, in step (a), the polymer resin may include one or more of a silicon resin, an epoxy resin, and an acrylic resin.

According to an embodiment, in step (b), the substrate may be a glass substrate.

According to an embodiment, in step (b), a thickness of the mixture may range from 1 um to 1 mm.

According to an embodiment, in step (c), curing the printed mixture may be performed at a temperature of 50° C. to 200° C. for 1 to 24 hours.

Advantageous Effects of Invention

According to the embodiments of the present invention, white light may be easily implemented even with cheap blue LEDs, and the existing light guide and blue LEDs may be used as is, thus helping saving costs. Also, use of the quantum dots allows for clearer colors and excellent color gamut compared to the existing YAG-based white LED implementation.

BRIEF DESCRIPTION OF DRAWINGS

The embodiments of the present invention will become readily apparent by reference to the following detailed description when considered in conjunction with the accompanying drawings wherein.

MODE FOR THE INVENTION

Figure 1:
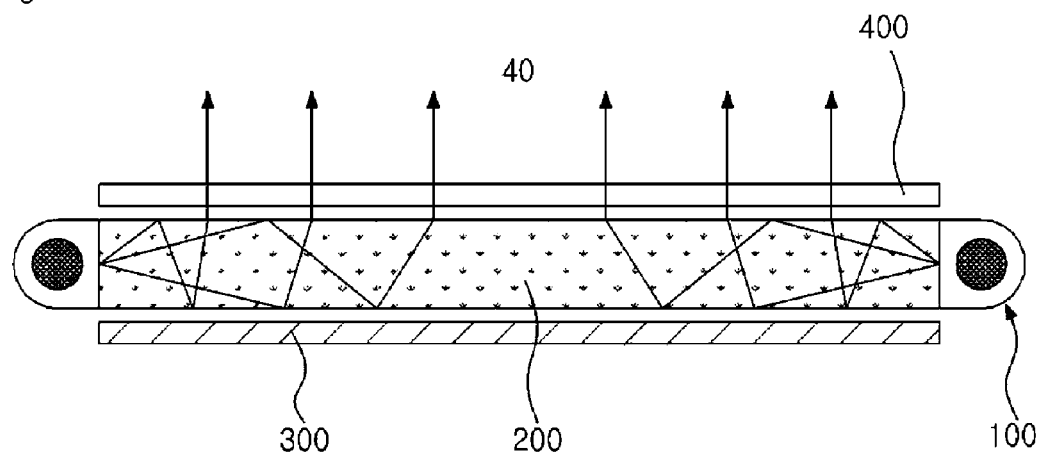
FIG. 1 is a cross-sectional view illustrating a white LED backlight unit according to the related art.
Figure 2:
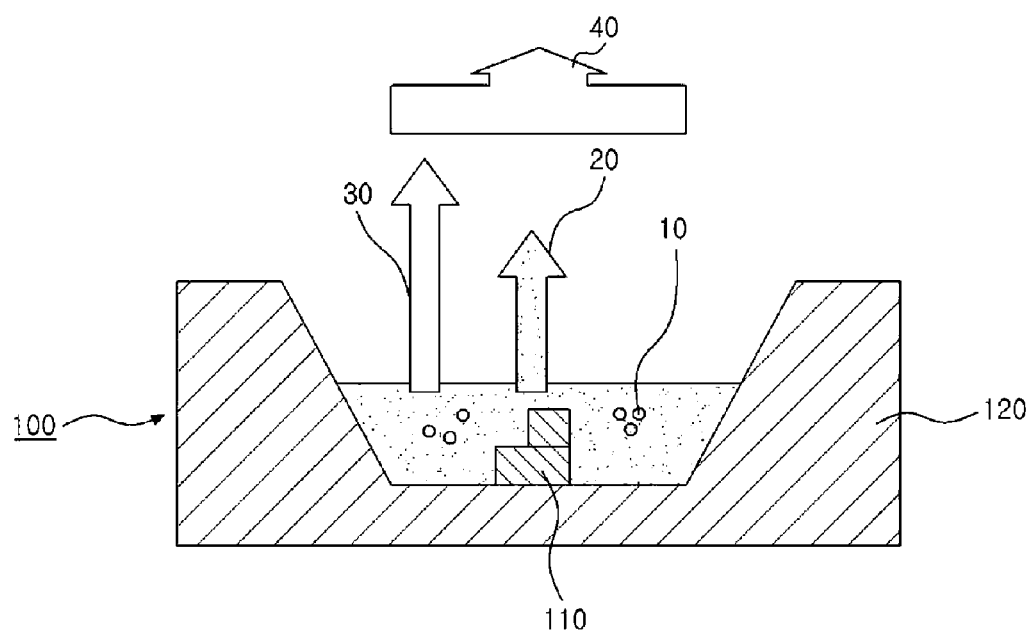
FIG. 2 is a cross-sectional view illustrating a white LED light source using a phosphor according to the related art.

Embodiments of the present invention relate to a technology of using quantum dots instead of phosphors in an LED backlight unit and a method of manufacturing a quantum dot high molecular material.

An embodiment of the present invention provides a member for a backlight unit using quantum dots, which includes a frame in which a blue LED is mounted and a light transmitting layer that is formed on the frame and includes quantum dots.

An embodiment of the present invention provides a method of manufacturing a member for a backlight unit, including mixing a polymer resin with a quantum dot solution to disperse the quantum dot solution in the polymer resin, printing the dispersed mixture on a substrate to have a predetermined thickness, curing the printed mixture, cutting the cured mixture to a predetermined shape, and removing the substrate.

Hereinafter, embodiments of the present invention will be described in detail with reference to the accompanying drawings, wherein the same reference numerals are used to denote the same or substantially the same elements throughout the drawings and the specification.

Figure 3:
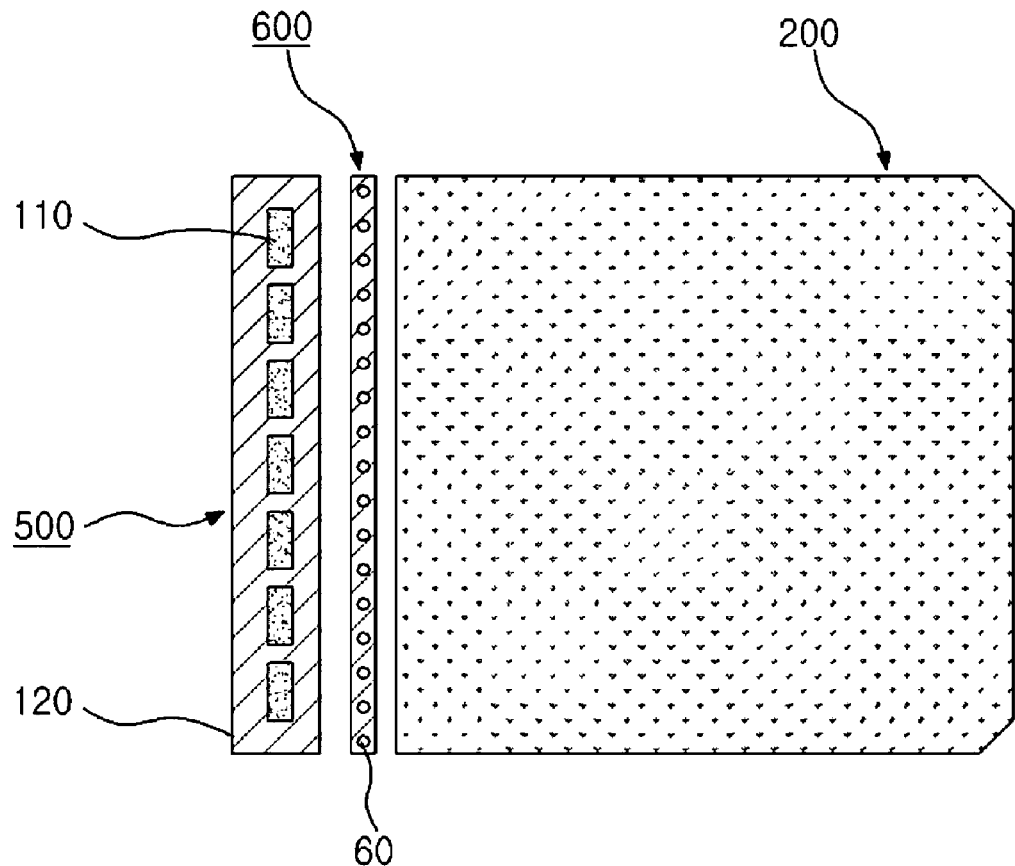
FIG. 3 is a view illustrating an assembled member for a backlight unit using quantum dots according to an embodiment of the present invention.

FIG. 3 is a view illustrating an assembled member for a backlight unit using quantum dots according to an embodiment of the present invention.

Referring to FIG. 3, the member for a backlight unit includes a light source 500 arranged at a side under an LCD panel and a light transmitting layer 600 that transmits light emitted from the light source 500 to a light guide 200. The light transmitting layer 600 includes quantum dots. The light source 500 includes a frame 120 and blue LEDs 110 mounted in the frame 120.

The light transmitting layer 600 is formed in a bar shape and faces the frame 120 of the light source 500. The quantum dots obtained as a research result of nano particle materials whose diameter is 1 nanometer recently attract a lot of attention as a new nano material. A quantum dot includes a central body having a size of about 2 to 10 nm and a ZnS shell which is coated with a high molecular material, such as, for example, a polymer resin. Due to the coating, the size of the quantum dot generally approaches 10 to 15 nm. The central body is primarily formed of CdSe, CdTe, or CdS.

The quantum dots have various characteristics that are not owned by other materials. For example, the quantum dots may cause strong fluorescence in a narrow wavelength range. The quantum dots generate light when unstable (floating) electrons drop from a conduction band to a valence band. As the size of the quantum dot decreases, a short wavelength of light is generated, and as the size increases, a long wavelength of light is generated. Accordingly, a desired wavelength of visible light may be obtained by adjusting the size of the quantum dot. In cases where there are quantum dots having various sizes, various colors of light may be generated at once by making the light have a single wavelength.

Figure 4:
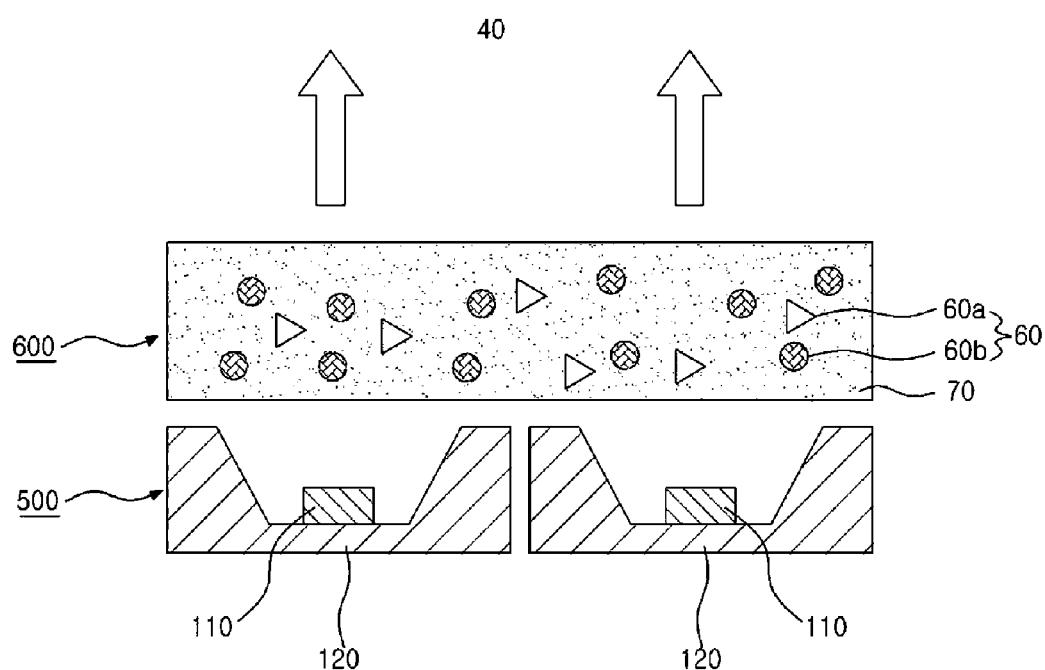
FIG. 4 is a cross-sectional view illustrating a member for a backlight unit using quantum dots according to an embodiment of the present invention.

FIG. 4 is a cross-sectional view illustrating a member for a backlight unit using quantum dots according to an embodiment of the present invention.

Referring to FIG. 4, the member for a backlight unit includes a light source 500 and a bar-shaped light transmitting layer 600 that is formed on frames 120 and converts blue light emitted from the light source 500 into white light 40. Specifically, blue LEDs 110 are mounted in the frames 120. According to an embodiment, the frame 120 may have a concave portion on which the blue LED 110 is mounted as shown in FIG. 4. The light transmitting layer 600 is brought in contact with the frames 120 to prevent light emitted from the blue LEDs 110 from leaking to a side surface.

The light transmitting layer 600 includes a high molecular material 70, such as, for example, a polymer resin, and quantum dots 60 buried in the high molecular material 70. The quantum dots 60 include either or both of red quantum dots 60a or/and green quantum dots 60b.

According to an embodiment, a size of a quantum dot 60 may range from 2 nm to 5 nm. As a quantum dot particle decreases, a short wavelength of light is radiated, and as a quantum dot particle increases, a long wavelength of light is radiated. According to an embodiment, a size of the green quantum dots 60b may be made to be smaller than a size of the red quantum dots 60a. Although it has been illustrated in FIG. 4 that the quantum dots 60 have circular and triangular shapes, the embodiments of the present invention are not limited thereto. According to embodiments, the quantum dots 60 may be shaped as rectangles or ellipses.

According to embodiments, the high molecular material 70 may be formed of a silicon resin, an epoxy resin, and an acrylic resin, alone or in a combination thereof.

A method of manufacturing the light transmitting layer 600 includes the steps of mixing a quantum dot solution with a polymer resin so that the quantum dot solution may be dispersed into the polymer resin (S1), printing the mixture on a glass substrate to have a predetermined thickness (S2), and curing the printed mixture, cutting the cured mixture to a predetermined shape, and removing the glass substrate (S3).

Specifically, in step S1, red quantum dots, each having a diameter of 2 nm to 5 nm, or green quantum dots that are smaller than the red quantum dots may be utilized as the quantum dots 60. One or more of a silicon resin, an epoxy resin, and an acrylic resin may be used as the polymer resin. In step S2, a mixture of the quantum dots and the polymer resin may be printed on a glass substrate to have a thickness of 1 um to 1 mm. In step S3, the printed mixture is cured at 200° C. for 1 to 23 hours, and the cured mixture is cut to a desired shape. Then, the glass substrate is removed, thus completing a quantum substrate used for a backlight unit.

Figure 5:
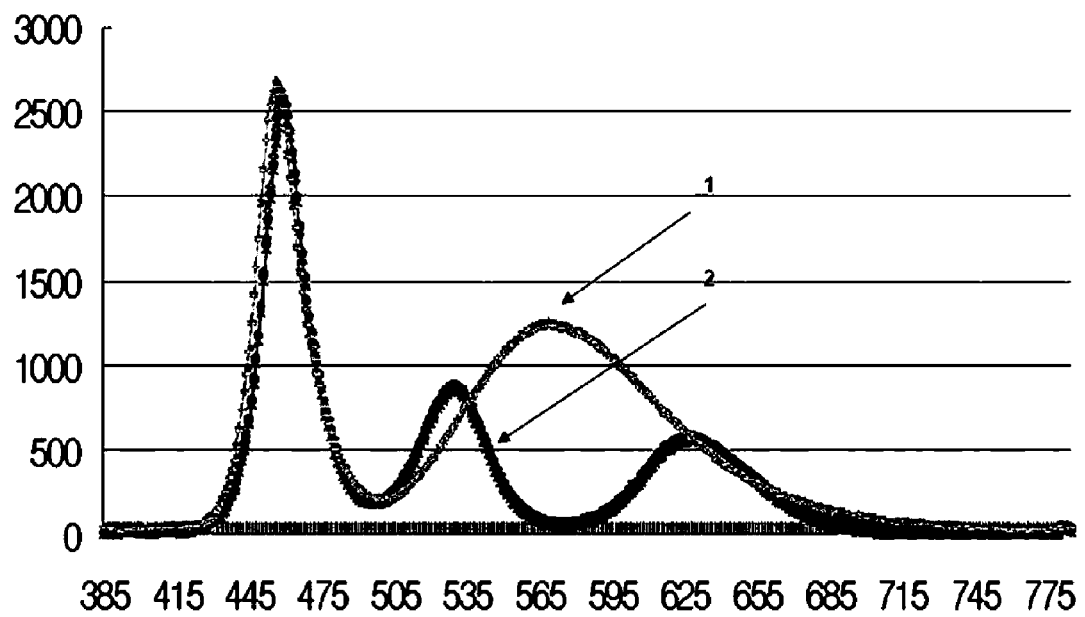
FIG. 5 is a graph illustrating a comparison of color gamuts between a conventional example of using YAG and an example of using quantum dots according to an embodiment of the present invention to implement a member for a backlight unit.

FIG. 5 is a graph illustrating a comparison of color gamuts between a conventional example of using YAG and an example of using quantum dots according to an embodiment of the present invention to implement a member for a backlight unit.

Referring to FIG. 5, '1' represents color gamuts in the case of implementing a member for a backlight unit using a YAG-based phosphor and a blue LED according to the related art, and '2' represents color gamuts in the case of implementing a member for a backlight unit using quantum dots according to an embodiment of the present invention.

As shown in FIG. 5, a peak color gamut in the case of '1' appears at a wavelength of about 450 nm that corresponds to a wavelength range of blue light. However, blue light relies primarily on the blue LED rather than the YAG-based phosphor, and thus, it is difficult to jump to a conclusion that the above result originated from the YAG characteristics. Moreover, a very broad wavelength range from about 555 nm to 560 nm exists over another color gamut peak. Thus, it is difficult to clearly reproduce red or green color.

On the contrary, in the case of '2'—that is, a member for a backlight unit using quantum dots according to an embodiment of the present invention, blue light may be realized by the blue LED as described above. Peaks respectively appear even at a wavelength rage of about 550 nm to about 560 nm, i.e., a wavelength range for green light, and at a wavelength range of about 620 nm to about 630 nm, i.e., a wavelength range for red light. From the above results, it can be seen that the embodiment of the present invention may show more clear color gamuts. The peaks may be further raised by adjusting the usage of the green quantum dots and the red quantum dots.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A member for a backlight unit using quantum dots comprising:
   a frame including a top surface and a concave portion lower than the top surface;
   a plurality of blue LEDs mounted on the concave portion;
   a light transmitting layer including a high molecular material and quantum dots buried in the high molecular material, the light transmitting layer having a first surface and a second surface opposite the first surface; and
   a light guide spaced from the light transmitting layer,
   wherein the light transmitting layer is spaced from the top surface of the frame out of the concave portion, and
   wherein the light transmitting layer is between the plurality of blue LEDs and the light guide so that the plurality of blue LEDs are adjacent the first surface of the light transmitting layer to direct light into the first surface and the light guide is adjacent the second surface of the light transmitting layer to receive light emitted from the second surface.

2. The member for a backlight unit of claim 1, wherein the quantum dot includes one or more of a red quantum dot and a green quantum dot that is smaller than the red quantum dot.

3. The member for a backlight unit of claim 1, wherein a diameter of the quantum dot ranges from 2 nm to 5 nm.

4. The member for a backlight unit of claim 1, wherein the high molecular material is a polymer resin that includes one or more of a silicon resin, an epoxy resin, and an acrylic resin.

5. A method of manufacturing a member for a backlight unit using quantum dots, the method comprising:
   mixing a high molecular resin with a quantum dots solution so that the quantum dots solution is dispersed in the high molecular resin;
   printing the mixture on a substrate to have a predetermined thickness;
   curing the printed mixture, cutting the cured mixture to a predetermined shape, and removing the substrate to form a light transmitting layer, the light transmitting layer having a first surface and a second surface opposite the first surface;
   mounting the light transmitting layer on a frame including a top surface and a concave portion lower than the top surface;
   positioning a light guide spaced from the light transmitting layer on a side opposite the frame; and
   positioning the light transmitting layer between the plurality of blue LEDs and the light guide so that the plurality of blue LEDs are adjacent the first surface of the light transmitting layer to direct light into the first surface and the light guide is adjacent the second surface of the light transmitting layer to receive light emitted from the second surface,
   wherein a plurality of blue LEDs is mounted on the concave portion, and
   wherein the light transmitting layer is spaced from the top surface of the frame out of the concave portion.

6. The method of claim 5, wherein the quantum dot includes one or more of a red quantum dot and a green quantum dot that is smaller than the red quantum dot.

7. The method of claim 5, wherein a diameter of the quantum dot ranges from 2 nm to 5 nm.

8. The method of claim 5, wherein the quantum dot has one of a circular shape, a triangular shape, a rectangular shape, and an elliptical shape, or quantum dots having two or more shapes among the circular shape, the triangular shape, the rectangular shape, and the elliptical shape are contained.

9. The method of claim 5, wherein the high molecular resin is a polymer resin that includes one or more of a silicon resin, an epoxy resin, and an acrylic resin.

10. The method of claim 5, wherein the substrate is a glass substrate.

11. The method of claim 5, wherein the thickness of the quantum dot solution-mixed polymer resin distributed on the substrate ranges from 1 μm to 1 mm.

12. The method of claim 5, wherein curing the printed mixture is performed at a temperature of 50° C. to 200° C. for 1 to 24 hours.

13. The member for a backlight unit of claim 2, wherein a diameter of the quantum dot ranges from 2 nm to 5 nm.

14. The member for a backlight unit of claim 2, wherein the light transmitting layer includes the quantum dot in a polymer resin.

15. The member for a backlight unit of claim 14, wherein the polymer resin includes one or more of a silicon resin, an epoxy resin, and an acrylic resin.

16. The method of claim 6, wherein a diameter of the quantum dot ranges from 2 nm to 5 nm.

17. The member for a backlight unit of claim 1, wherein the light transmitting layer contacts the top surface of the frame.

18. The member for a backlight unit of claim 1, wherein the light transmitting layer is located on the top surfaces of at least two frames.

19. The member for a backlight unit of claim 18, wherein the light transmitting layer contacts the top surfaces of the two frames.

20. The member for a backlight unit of claim 1, wherein the thickness of the high molecular material ranges from 1 μm to 1 mm.

\* \* \* \* \*